United States Patent [19]

York

[11] 4,035,704
[45] July 12, 1977

[54] FIELD WEAKENING SENSOR CIRCUIT

[75] Inventor: Robert A. York, Mechanicsburg, Pa.

[73] Assignee: Flight Systems, Inc., Mechanicsburg, Pa.

[21] Appl. No.: 610,814

[22] Filed: Sept. 5, 1975

[51] Int. Cl.² .................................... H02P 7/00
[52] U.S. Cl. ........................... 318/358; 318/356; 318/317; 318/251; 318/428; 318/528
[58] Field of Search .................. 318/357–358, 318/532–533, 251, 310, 317, 355, 356, 528, 350, 359, 400, 428

[56] References Cited

U.S. PATENT DOCUMENTS

| | | | |
|---|---|---|---|
| 3,193,698 | 7/1965 | Henderson et al. | 318/428 |
| 3,384,799 | 5/1968 | Thiele | 318/249 |
| 3,590,352 | 6/1971 | Ries | 318/251 |
| 3,656,038 | 4/1972 | Ries et al. | 318/251 |

Primary Examiner—Robert K. Schaffer
Assistant Examiner—Michael K. Mutter
Attorney, Agent, or Firm—Seidel, Gonda & Goldhammer

[57] ABSTRACT

Apparatus is disclosed for controlling the speed of an electric motor by selectively connecting a field weakening resistor across the field winding of an electric motor. A first means is provided for comparing the field voltage to a fixed reference voltage and for generating a first signal in response to the field voltage falling below a first predetermined value and a second signal in response to the field voltage rising above a second predetermined value. A second means responsive to the first and second signals is provided for selectively connecting a field weakening resistor across the field winding of the motor in response to the field voltage falling below the first predetermined value. The second means responsive also disconnects the field weakening resistor in response to the field voltage rising above the second predetermined value.

16 Claims, 1 Drawing Figure

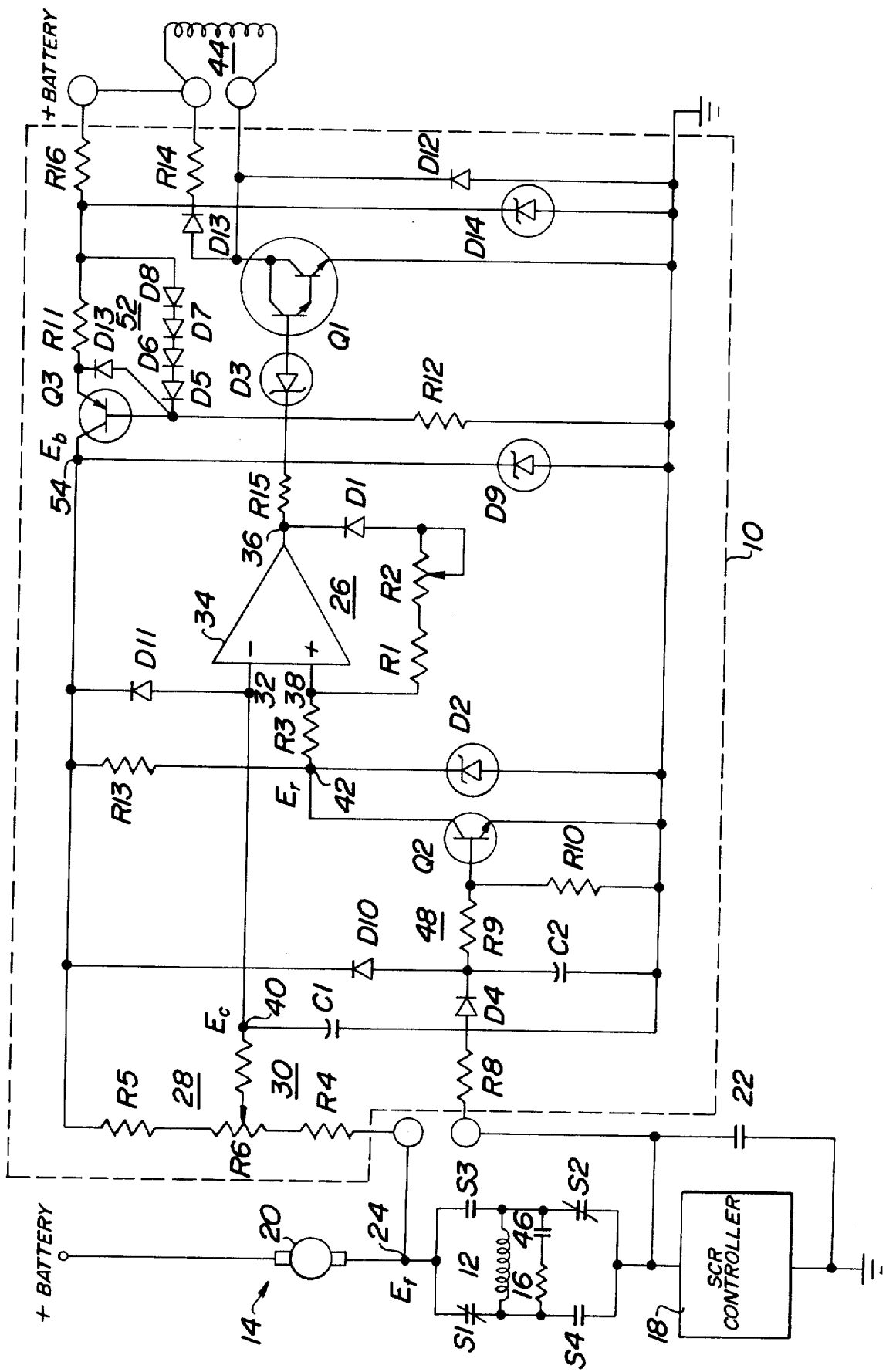

FIELD WEAKENING SENSOR CIRCUIT

BACKGROUND OF THE INVENTION

The present invention relates to a control circuit for selectively connecting a field weakening resistor across the field winding of an electric motor. More particularly, the present invention relates to a control circuit which compares the voltage across the field winding of a series connected electric motor to a constant reference voltage and which disconnects the field weakening resistor whenever the field voltage rises above a preselected value.

It is well-known in the art that the speed of an electric motor can be increased by placing a field weakening resistor in parallel with the field winding of a series connected dc motor. The parallel resistor provides an alternative path for the field current thereby reducing the back electromagnetic force (emf) generated in the armature. Since the back emf generated in a series dc motor will always attempt to attain a constant steady state value, the introduction of the field weakening resistor will cause the motor speed to increase in an effort to compensate for the reduced field current.

While traditional field weakening systems provide an effective means for increasing the top speed of an electric motor, they may cause damage to the motor under heavy load conditions. If a heavy load is applied to the motor while the motor is operating at top speeds, the increased load will cause an immediate decrease in motor speed. The decrease in motor speed will, in turn, cause a severe decrease in the back emf generated by the motor. In order to compensate for this reduction in back emf, the motor will attempt to increase the current through the field winding of the motor. If a field weakening resistor is connected in parallel with the field winding, a very large amount of armature current must flow to produce the required torque. This severe increase in armature current can easily damage the series motor.

To avoid this possibility, the present invention provides apparatus for sensing the voltage across the field winding of a series wound dc motor and for selectively disconnecting the field weakening resistor whenever the voltage across the field winding (due to increased current through the field winding) increases beyond some predetermined value.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

The circuit shown in the drawing is a schematic diagram of the preferred embodiment of the present invention.

DETAILED DESCRIPTION OF THE PREFERRED EMBODIMENT

Referring now to the drawings wherein like numerals indicate like elements, there is shown a control circuit 10 constructed in accordance with the principles of the present invention. Control circuit 10 senses the voltage across the field winding 12 of an electric motor 14 and selectively connects a field weakening resistor 16 across the field winding 12 whenever the speed of the motor 14 surpasses some predetermined value.

As noted above, the use of field weakening resistors to increase the speed of a series dc motor is old in the art. While such field weakening systems have been generally replaced by SCR controllers, they are still used in conjunction therewith. A typical application is illustrated in the drawing wherein an SCR controller 18 is connected in series with the motor 14. So connected, SCR controller 18 supplies motor 14 with pulses of direct current for the purpose of controlling the speed of the motor between some predetermined minimum and some predetermined maximum value. Once the speed of the motor 14 has surpassed this maximum value, SCR controller 18 closes normally open switch 22 thereby applying the full battery voltage to the motor 14. It is at this point that control circuit 10 exercises control over the speed of motor 14.

It should be noted at this point that switches S1, S2, S3 and S4 serve merely to control the polarity of field winding 12. More particularly, if the field winding 12 of motor 14 is to be forward wound, normally closed switches S1 and S2 are closed and normally open switches S3 and S4 are open. Conversely, if field winding 12 of motor 14 is to be reverse wound, normally closed switches S1 and S2 are open and normally open switches S3 and S4 are closed.

As noted above, the current through the field winding 12 of the motor 14 is inversely proportional to the speed of the motor 14. This fact has long been exploited in field weakening systems as a means for determining when the field weakening resistor 16 should be connected across the field winding 12. The present invention utilizes the same principle but monitors the field voltage $E_f$ appearing across the field winding 12 rather than the field current running through the field winding 12. Since the field voltage $E_f$ is due to ohmic losses in the field winding, it is proportional to the field current and therefore inversely proportional to the speed of the motor 14.

The field voltage $E_f$ is applied to the sensing element 26 of control circuit 10 through a scaling circuit 28 and a time delay circuit 30. More particularly, a control voltate $E_c$ which is representative of the field voltage (and therefore the motor speed) is applied to the inverting input terminal 32 of operational amplifier 34. Operational amplifier 34 is a standard operational amplifier which is connected to operate as a Schmidt trigger. Particularly, the output terminal 36 of operational amplifier 34 is connected to the non-inverting input terminal 38 of operational amplifier 34 through resistors R1 and R2 and diode D1. So connected, operational amplifier 34 will compare the control signal $E_c$ appearing at junction 40 to a fixed temperature compensated reference voltage $E_r$ appearing at junction 42 and will generate either a positive or negative output signal in response thereto. More particularly, due to the high gain characteristics of operational amplifier 34, its output terminal 36 will jump to its positive saturation value $+E_{sat}$ whenever the value of the control voltage $E_c$ falls below a predetermined percentage of the reference voltage $E_r$ and will jump to the negative saturation value $-E_{sat}$ whenever the value of control voltage $E_c$ rises above the value of reference voltage $E_r$. The predetermined percentage of the reference voltage $E_r$ below which the control voltage must fall before the output of operational amplifier 34 jumps to the positive saturation value $+E_{sat}$ is determined by the setting of resistor R2.

The output of operational amplifier 34 is applied to the base of transistor Q1 through resistor R15 and Zener diode D3. Transistor Q1 is an NPN Darlington transistor which will turn on whenever a positive voltage is applied to its base. Diode D3 is provided to assure that transistor Q1 will not turn on until the output terminal 36 of operational amplifier 34 jumps to the positive saturation value $+E_{sat}$. As such, whenever the value of the control voltage $E_c$ falls below a predetermined percentage (dictated by resistor R2) of the reference voltage $E_r$, the output terminal 36 of operational amplifier 34 will jump to the positive saturation value $+E_{sat}$ and transistor Q1 will turn on. When transistor Q1 turns on current flows through contactor coil 44 thereby closing contact 46 and connecting field weakening resistor 16 across field winding 12. Conversely, when control voltage $E_c$ rises above the reference voltage $E_r$, output terminal 36 of operational amplifier 34 will jump to the negative saturation value $-E_{sat}$ thereby turning transistor Q1 off. When transistor Q1 turns off, current will stop flowing through contactor coil 44 thereby opening contact 46 and disconnecting field weakening resistor 16.

In the preferred embodiment, operational amplifier 34 is a commercially available 741TC. When using such an operational amplifier, the negative saturation voltage $-E_{sat}$ is actually an above ground potential of about 1.5 volts dc. Under such a condition, Zener diode D3 provides an offset voltage which biases transistor Q1 off until the output of operational amplifier 34 jumps to the positive saturation value $+E_{sat}$.

In summary, circuit 10 will connect field weakening resistor 16 across field winding 12 whenever the control voltage $E_c$ falls below a predetermined percentage (dependent upon the setting of variable resistor R2) of reference voltage $E_r$ and will disconnect field weakening resistor 16 whenever the control voltage $E_c$ rises above the reference voltage $E_r$. The operation of control circuit 10, is, therefore, directly dependent on the value of control voltage $E_c$.

As noted above, the control voltage $E_c$ is directly proportional to field voltage $E_f$ and therefore indirectly proportional to the speed of motor 14. Since the operation of control circuit 10 is directly dependent upon the value of control voltage $E_c$ it is possible to adjust the pickup and drop out points (motor speed at which field weakening resistor 16 is connected and disconnected across field winding 12, respectively) of circuit 10 by adjusting the proportionality between control voltage $E_c$ and field voltage $E_f$. That is, since the field weakening resistor is disconnected whenever the control voltage $E_c$ rises above the reference voltage $E_r$, it is possible to control the exact drop out point at control circuit 10 by adjusting the proportionality between the control voltage $E_c$ and the field voltage $E_f$. In order to provide the desired control over the proportionality between control voltage $E_c$ and field voltage $E_f$, a scaling circuit 28 comprising resistors R4, R5 and adjustable R6 is provided.

It should be recognized that the constant of proportionality between the motor speed and the field voltage changes when the field weakening resistor 16 is connected across the field winding 12. This is not a serious limitation, however, because it is the drop out point (the point at which the field weakening resistor is disconnected) which is of primary interest. As noted above, control circuit 10 is designed to protect the motor 14 from being damaged due to current overloads during heavy load conditions. As such, the critical limitation on control circuit 10 is that the control circuit disconnect the field weakening resistor 16 whenever the motor speed falls below some minimum value. Since control circuit 10 will disconnect field weakening resistor 16 as soon as the control voltage $E_c$ rises above the reference voltage $E_r$, control over the proportionality between the control voltage $E_c$ and the field voltage $E_f$ assures that field weakening resistor 16 will be disconnected when the speed of motor 14 decreases to some predetermined minimum value.

The change in the constant of proportionality between field voltage $E_f$ and the speed of motor 14 does, however, prevent scaling circuit 28 from providing direct control over the pick up point of control circuit 10. Such control is provided, however, by resistor R2 in the feedback loop of operational amplifier 34. Particularly, since control circuit 10 will not connect field weakening resistor 16 across field winding 12 until control voltage $E_c$ falls below a percentage of reference voltage $E_r$ determined by the setting on variable resistor R2, it is possible to adjust the pick up point of control circuit 10 by adjusting resistor R2 independently of resistor R5. As such, the preferred embodiment of the present invention provides a means for independently selecting the speeds of motor 14 at which the field weakening resistor will be connected and disconnected across field winding 12.

An additional feature of the present invention is time delay circuit 30. Time delay circuit 30 comprises a resistor R7 and a capacitor C1 and provides a means for delaying the response of control circuit 10 to changes in the motor speed. This feature helps prevent circuit 10 from switching in or cutting out field weakening resistor 16 in response to transient changes in the field voltage $E_f$. In addition, time delay circuit 30 provides immunity against momentary transients that may appear at junction 24.

In summary, control circuit 10 will connect field weakening resistor 16 across field winding 12 in response to the field voltage $E_f$ falling below a first predetermined value dictated by the setting of resistors R2 and R6 and will disconnect field weakening resistor 16 whenever the field voltage $E_f$ rises above a second predetermined value dictated by the setting of resistor R5.

As noted above, SCR controller 18 supplies motor 14 with pulses of direct current for the purpose of controlling the speed of the motor between some predetermined minimum and some predetermined maximum value. It is essential that field weakening resistor 16 not be connected across field winding 12 while motor 14 is supplied by SCR controller 18 so that motor 14 will not be damaged due to excess armature current. For this reason, a threshold circuit 48 comprising transistor Q2, diode D4, capacitor C2 and resistors R8, R9 and R10 is provided. As long as SCR controller 18 is active, normally open switch 22 will be open and a positive voltage will appear at junction 50. This positive voltage is applied to the base of transistor Q2 through a voltage divider comprising resistors R8, R9 and R10. The positive voltage applied to the base of transistor Q2 turns transistor Q2 on thereby clamping junction 42 to ground. As long as transistor Q2 remains on, output terminal 36 of operational amplifier 34 will be at the negative saturation value $-E_{sat}$, transistor Q1 will be off and no current will flow through contactor coil 44. When the speed of motor 14 finally surpasses the range of SCR controller 18, SCR controller 18 closes normally open switch 22 thereby clamping junction 50 to ground. With junction 50 at ground potential, the base of transistor Q2 decays from some maximum value to 0 volts dc at a rate determined by the time constant of resistors R9 and R10 and capacitor C2. When the voltage at the base of transistor Q2 becomes sufficiently low, transistor Q2 turns off and the voltage at junction 42 jumps to the reference voltage $E_r$ determined by Zener diode D2. At this point, control circuit 10 becomes active and selectively switches in or cut out field weakening resistor 16 in the manner described above.

Should the speed of motor 14 fall within the SCR range, switch 22 is opened and a positive voltage is again applied to junction 50. Diode D4 is forward biased and capacitor C2 charges at a rate determined by the equivalent resistance of resistors R8 and R9, R10 and the capacitance of capacitor C2. When capacitor C2 is sufficiently charged, transistor Q2 will be biased on and switch 46 will be open.

In the preferred embodiment, the value of resistor R8 is substantially less than the value of resistors R9 and R10. This provides a desirable time delay between the closure of switch 22 and the closure of switch 46 thereby preventing a "lurch" or a sudden change in travel speed which would otherwise result from the concurrent of switches 22 and 46. Additionally, due to the relatively short charging time constant of circuit 48, switch 46 opens almost immediately following the opening of switch 22.

Summarizing, threshold circuit 48 prevents closure of switch 46 as long as there is any positive pulsing at junction 50, over a wide range of frequency and duty cycle. Circuit 48 further provides a desirable time delay between the closing of switch 22 and the closing of switch 46 thereby preventing an undesirable "lurching" of a lift truck or other vehicle powered by motor 14 when passing from the SCR to the field weakening range of operation. Finally, circuit 48 provides a means for opening switch 46 almost spontaneously with the opening of switch 22 thereby insuring that the field weakening resistor is not connected across the field winding during the SCR range of operation.

Another feature of the present invention is an adaptor circuit 52 comprising transistor Q3, diodes D5, D6, D7, D8, D9 and D13 and resistors R11 and R12. Transistor Q3 acts as a quasi-constant current source and supplies Zener diode D9 with a sufficient amount of current to keep it fully back biased. In this condition, junction 54 is kept at a constant biasing voltage $E_b$ determined by Zener diode D9 as long as the battery voltage is greater than the biasing voltage $E_b$. Accordingly, adaptor circuit 52 enables the same sensor circuit with a fixed set of component values to operate over a wide range of supply voltages.

The preferred values of the components of circuit 10, as described above, are given in Table 1. below.

TABLE 1

| Resistors | | Diodes | | | Capacitors | | Transistors | | Operational Amplifier | Contractor Coil | |
| --- | --- | --- | --- | --- | --- | --- | --- | --- | --- | --- | --- |
| R1 | 10K | D1 | — | 1N4002 | C1 | 25/25v | Q1 | 2N6055, 2N6056, 2N6057 | 34 741TC | 44 — | Appropriate for battery voltage being used. |
| R2 | 100K | D2 | — | 1N5232B | C2 | 25/25v | Q2 | 2N3904 | | | |
| R3 | 2.2K | D3 | — | 1N5232B | C2 | 25/25V | Q3 | MPS-V57 | | | |
| R4 | 1.5K | D4 | — | 1N4002 | | | | | | | |
| R5 | 4.7KΩ | D5 | — | 1N4002 | | | | | | | |
| R6 | 1.0K | D6 | — | 1N4002 | | | | | | | |
| R7 | 3.3K | D7 | — | 1N4002 | | | | | | | |
| R8 | 8.2K | D8 | — | 1N4002 | | | | | | | |
| R9 | 10K | D9 | — | 1N4744A | | | | | | | |
| R10 | 47K | D10 | — | 1N4002 | | | | | | | |
| R11 | 180Ω | D11 | — | 1N4002 | | | | | | | |
| R12 | 10K | D12 | — | 1N4002 | | | | | | | |
| R13 | 2.2K | D13 | 1N4002 | | | | | | | | |
| R14 | 10Ω | D14 | — | 1N4762 | | | | | | | |
| R15 | 2.2K | | | | | | | | | | |
| R16 | 270Ω | | | | | | | | | | |

While the sensing element 26 in the preferred embodiment described above is an operational amplifier connected to operate as a Schmidt trigger, it should be recognized by those skilled in the art that other comparators such as an operational amplifier connected without a feedback loop may be utilized without departing from the spirit or scope of the present invention. The present invention may be embodied in yet other specific forms without departing from the spirit or essential attributes thereof and, accordingly, reference should be made to the appended claims, rather than to the foregoing specification as indicating the scope of the invention.

What is claimed is:

1. Apparatus for controlling the speed of an electric motor by sensing the field voltage across the field winding of the electric motor, comprising:
   comparator means for comparing said field voltage to a reference voltage and for generating a first signal in response to said field voltage falling below a first predetermined value, said comparator means also for generating a second signal in response to said field voltage rising above a second predetermined value;
   means responsive to said first and second signals for connecting a field weakening resistor in parallel with the field winding of the electric motor whose speed is being controlled in response to said comparator means generating said first signal, said means responsive also for disconnecting said field weakening resistor in response to said comparator means generating said second signal.

2. Apparatus in accordance with claim 1, including means for delaying the response of said comparator means to changes in said field voltage.

3. Apparatus in accordance with claim 1, including means for adjusting said first predetermined value.

4. Apparatus in accordance with claim 1, including means for adjusting said second predetermined value.

5. Apparatus in accordance with claim 1, including means for preventing said comparator means from generating said first signal whenever the speed of the motor whose speed is being controlled is less than some predetermined minimum value.

6. Apparatus in accordance with claim 1, wherein said comparator means comprises an operational amplifier having inverting and non-inverting input terminals and an output terminal, said output terminal being connected through a resistor to said non-inverting input terminal such, that said operational amplifier operates as a Schmidt trigger.

7. Apparatus in accordance with claim 6, wherein said resistor is a variable resistor.

8. Apparatus in accordance with claim 1, including means for adapting said apparatus to be operable over a large range of battery voltages.

9. Apparatus for controlling the speed of an electric motor by sensing the field voltage across the field winding of the electric motor, comprising:
operational amplifier means having inverting and non-inverting input terminals and an output terminal;
first means for applying a voltage representative of said field voltage to one of said input terminals of said operational amplifier;
second means for applying a reference voltage to the remaining input terminal of said operational amplifier;
third means electrically connected to said output terminal if said operational amplifier and responsive to the voltage at the output of said operational amplifier for connecting a field weakening resistor across the field winding of the electric motor whose speed is being controlled in response to said field voltage age falling below a first predetermined value and for disconnecting said field weakening resistor in response to said field voltage rising above a second predetermined value.

10. Apparatus in accordance with claim 9, including means for delaying the response of said third means to changes in said field voltage.

11. Apparatus in accordance with claim 9, including means for selecting said first predetermined value.

12. Apparatus in accordance with claim 9, including means for selecting said second predetermined value.

13. Apparatus in accordance with claim 9, including means for preventing said third means from connecting said field weakening resistor across the field winding of the motor whose speed is being controlled whenever the speed of the motor is less than some predetermined minimum value.

14. Apparatus in accordance with claim 9, including means for adapting said apparatus to be operable over a large range of battery voltages.

15. Apparatus in accordance with claim 9, wherein said output terminal of said operational amplifier is connected through a resistor to the non-inverting input terminal of said operational amplifier such that said operational amplifier operates as a Schmidt trigger.

16. Apparatus in accordance with claim 15, wherein said resistor is a variable resistor and wherein said variable resistor comprises a means for adjusting said first predetermined value.

* * * * *